United States Patent
Hamilton

(10) Patent No.: US 10,462,956 B2
(45) Date of Patent: Nov. 5, 2019

(54) DOWN FORCE CONTROL TO ALLOW FOR EASIER DEPTH ADJUSTMENT

(71) Applicant: AGCO Corporation, Duluth, GA (US)

(72) Inventor: Kevin J Hamilton, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 259 days.

(21) Appl. No.: 15/627,606

(22) Filed: Jun. 20, 2017

(65) Prior Publication Data

US 2017/0367251 A1   Dec. 28, 2017

Related U.S. Application Data

(60) Provisional application No. 62/355,381, filed on Jun. 28, 2016.

(51) Int. Cl.

| *A01B 63/114* | (2006.01) |
| *A01C 7/20* | (2006.01) |
| *A01B 63/16* | (2006.01) |
| *A01B 63/00* | (2006.01) |

(52) U.S. Cl.
CPC ............ *A01B 63/16* (2013.01); *A01B 63/002* (2013.01); *A01C 7/203* (2013.01); *A01C 7/205* (2013.01)

(58) Field of Classification Search
CPC ..... A01B 49/027; A01B 61/046; A01B 63/32; A01B 63/111; A01B 33/087; A01B 63/16; A01B 63/002; A01C 5/062; A01C 5/064; A01C 5/068; A01C 23/025; A01C 7/203; A01C 7/205; A01C 7/105; A01C 7/006
USPC ..................... 111/135, 200; 172/260.5, 1–11
See application file for complete search history.

(56) References Cited

U.S. PATENT DOCUMENTS

| 6,701,857 | B1 * | 3/2004 | Jensen | ................. A01B 63/32 111/200 |
| 8,448,717 | B2 * | 5/2013 | Adams | ................. A01C 7/203 111/135 |
| 8,577,561 | B2 | 11/2013 | Green et al. | |
| 8,924,092 | B2 | 12/2014 | Achen et al. | |
| 9,215,837 | B2 * | 12/2015 | Adams | ................. A01C 7/203 |
| 9,307,689 | B2 * | 4/2016 | Adams | ................. A01C 7/203 |
| 10,264,724 | B2 * | 4/2019 | Adams | ................. A01C 7/203 |
| 2012/0048159 | A1 | 3/2012 | Adams et al. | |
| 2013/0032363 | A1 | 2/2013 | Curry et al. | |
| 2013/0213676 | A1 * | 8/2013 | Bassett | ................. A01C 7/205 172/260.5 |
| 2015/0264857 | A1 | 9/2015 | Achen et al. | |

FOREIGN PATENT DOCUMENTS

| WO | 2012/149415 A1 | 11/2012 |
| WO | 2014/153157 A1 | 9/2014 |

OTHER PUBLICATIONS

UK Intellectual Property Office, International Search Report for related UK Application No. GB1612628.6, dated Jan. 24, 2017.

* cited by examiner

*Primary Examiner* — Robert E Pezzuto

(57) ABSTRACT

A row unit, including a frame with an upper portion and a lower portion, the upper portion having a parallel linkage, the lower portion having a gauge wheel depth control linkage, the gauge wheel depth control linkage coupled to plural gauge wheels; a first device coupled to the upper portion and configured to provide an adjustable down force; and an electric actuator coupled to the gauge wheel depth control linkage, the electric actuator configured to provide adjustable positioning of the gauge wheels.

18 Claims, 6 Drawing Sheets

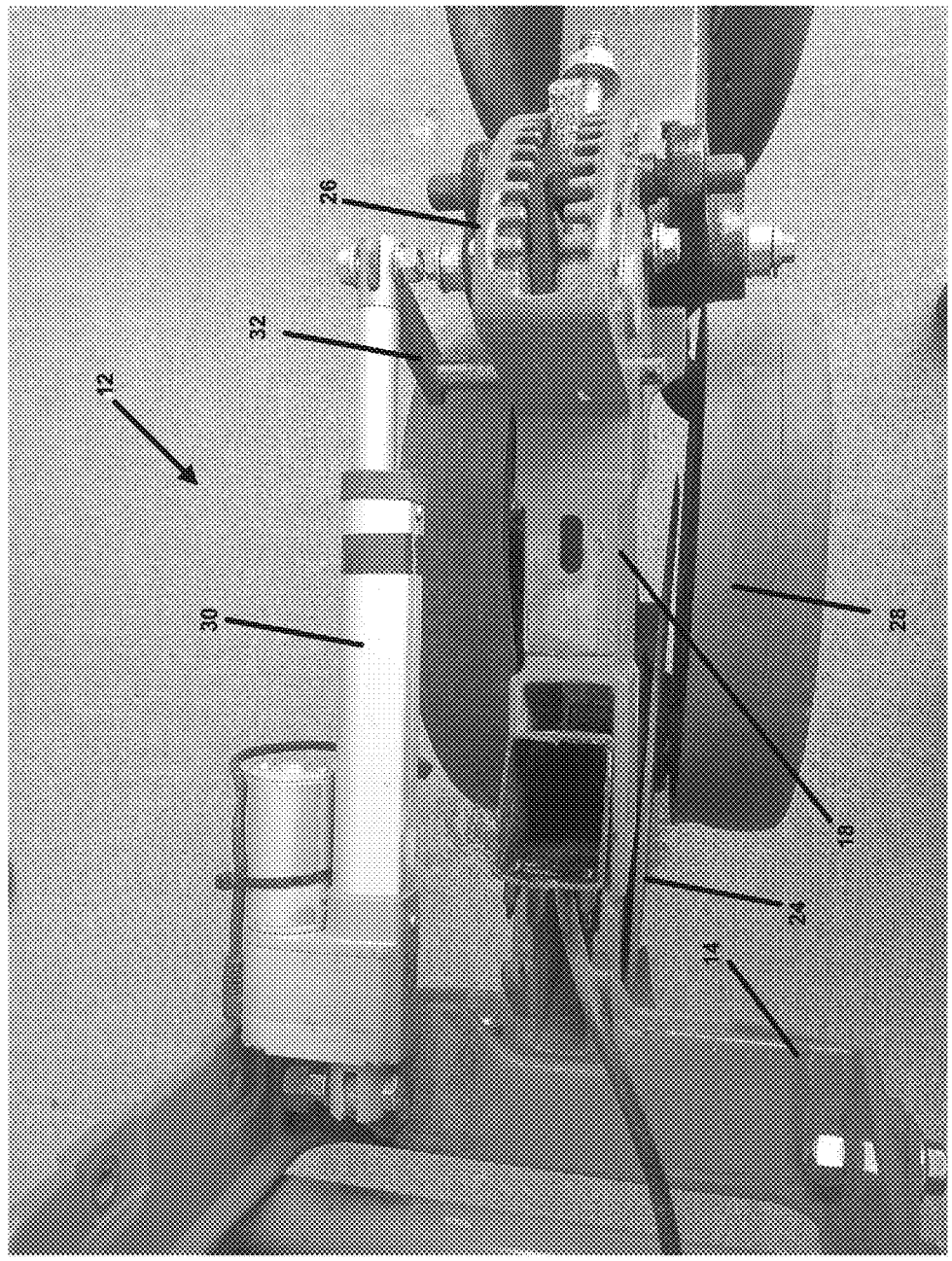

U.S. 10,462,956 B2

DOWN FORCE CONTROL TO ALLOW FOR EASIER DEPTH ADJUSTMENT

CROSS REFERENCE TO RELATED APPLICATION

This application claims the benefit of U.S. Provisional Application No. 62/355,381 filed Jun. 28, 2016, which is hereby incorporated by reference in its entirety.

TECHNICAL FIELD

The present disclosure is generally related to agricultural equipment, and more particularly, agricultural equipment for seeding.

BACKGROUND

Current planter technology requires an operator to leave the cab of a towing vehicle to adjust row unit depth. On larger planters, this can take a considerable amount of time. Also, large planters (e.g., having forty-eight (48) row units) cover a large amount of acreage, and conditions can change quickly as an operator navigates the vehicle and the towed planter through fields and between fields.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a schematic diagram that illustrates, in overhead plan view, an example electric actuator coupled to a lower portion of the row unit of FIG. 3.

DESCRIPTION OF EXAMPLE EMBODIMENTS

Overview

Figure 1:
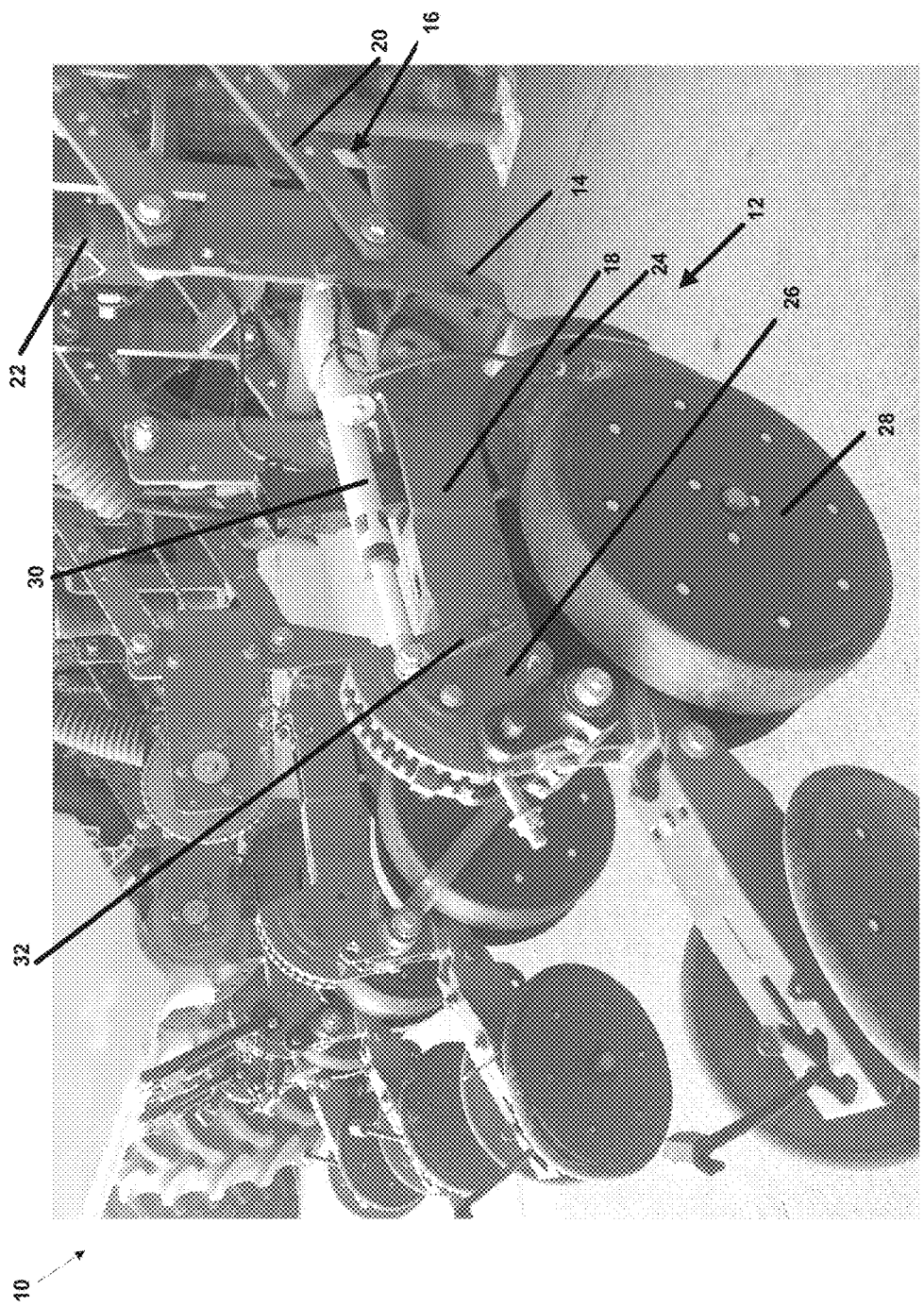
FIG. 1 is a schematic diagram that illustrates, in right rear perspective view, a plurality of row units for which certain embodiments of a planter depth control system may be used.

In one embodiment, a row unit, comprising: a frame comprising an upper portion and a lower portion, the upper portion comprising a parallel linkage, the lower portion comprising a gauge wheel depth control linkage, the gauge wheel depth control linkage coupled to plural gauge wheels; a first device coupled to the upper portion and configured to provide an adjustable down force; and an electric actuator coupled to the gauge wheel depth control linkage, the electric actuator configured to provide adjustable positioning of the gauge wheels.

Detailed Description

Certain embodiments of a planter depth control system and method are disclosed that use row unit down force control to minimize the force needed to move a gauge wheel depth control linkage through the use of an electric actuator and thus reduce the physical size and amperage needs of the electric actuator. In one embodiment, an input is received at a controller that corresponds to an indication of a need for depth adjustment through re-positioning of the gauge wheels. The input may be based on a manual input (e.g., via an operator user interface in the cab or elsewhere), a sensor input (e.g., from a real-time sensor system), or from a prescribed depth map. Based on the input, such as to cause a shallower depth, the controller causes a reduction in the existing target down force margin via actuation of an actuable device (e.g., air bag, hydraulic actuator, pneumatic actuator, etc.). This reduction may represent a ten-fold (10×) reduction in the force needed for the electric actuator to move the gauge wheel depth control linkage. In one embodiment, the targeted down force may be comprised of any value within a range of approximately fifty (50) to one hundred-fifty (150) pounds. Based on the new target down force, the controller (or in some embodiments, the actuable device) signals the electric actuator to provide adjustment in the position of the gauge wheels to effect a shallower depth. Once the depth adjustment has been completed (and/or based on feedback from the electric actuator or a sensor), the controller causes the actuable device to increase the down force to return to its pre-existing target margin. In some embodiments, such as where further depth is requested and/or indicated as needed, the down force is maintained at its current value, and the electric actuator merely actuates to adjust the position of the gauge wheels to effect an increased depth. Note that in some embodiments, the change in down force margin may occur sequentially across a larger planter, enabling at any given time, a maximum current draw that remains below a predetermined threshold, beyond which additional equipment may be required (e.g., an additional generator and/or battery).

Digressing briefly, conventional planter systems either handle depth (setting) adjustment manually (e.g., via an iterative process requiring the operator to repeatedly leave the cab, which may be burdensome for larger planters) or through the use of a different type of actuator (e.g., pneumatic, hydraulic, etc.). To use electric actuators, down force can only be overcome (e.g., upon requiring the row unit to be raised) using large-profile, high-amperage-draw electric or electric-over-hydraulic actuators. However, such actuators theoretically capable of countering the down forces in standard row units are nonetheless too large to fit in the available space of existing row units. Further providing an obstacle to practical implementation of such large profile actuators is the requirement of drawing high amperage loads (e.g., 8-20 amps), which creates a need for additional components to enable sufficient power. In contrast, certain embodiments of a planter depth control system, through cooperation of different actuating systems and linkages for downforce and depth adjustment, enables depth setting adjustment through gauge wheel positioning using an electric actuator with a maximum current draw of less than eight amps, and in some embodiments, less than a maximum of two amps (e.g., as low as one and one-half (1.5) amps). The low amperage requirements of the electric actuator for certain embodiments of the planter depth control system translates to smaller profile electric actuators that fit within the existing space constraints of today's row units, and circumvent the need for additional power provisioning equipment.

Having summarized certain features of a planter depth control system of the present disclosure, reference will now be made in detail to the description of the planter depth control system as illustrated in the drawings. While the planter depth control system is described in connection with these drawings, there is no intent to limit the planter depth control system to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

It is noted that reference herein to left and right and front and rear is from the perspective of an operator navigating a tractor or other towing vehicle that tows a planter in a forward direction. Also, reference to down force refers to the force that is applied to a row unit by an actuable device, such as an air bag, hydraulic or pneumatic actuator, etc. Reference to down force margin includes an amount of additional down force applied to a row unit that is beyond that required to achieve penetration (e.g., by furrow openers) to a desired planting depth, the additional weight carried by gauge wheels. The soil provides a resistance to the penetration. Thus, the sum of the weight of the row unit and the down force, with the soil resistance subtracted from the sum, equates to a down force margin (e.g., target down force margin).

Figure 2:
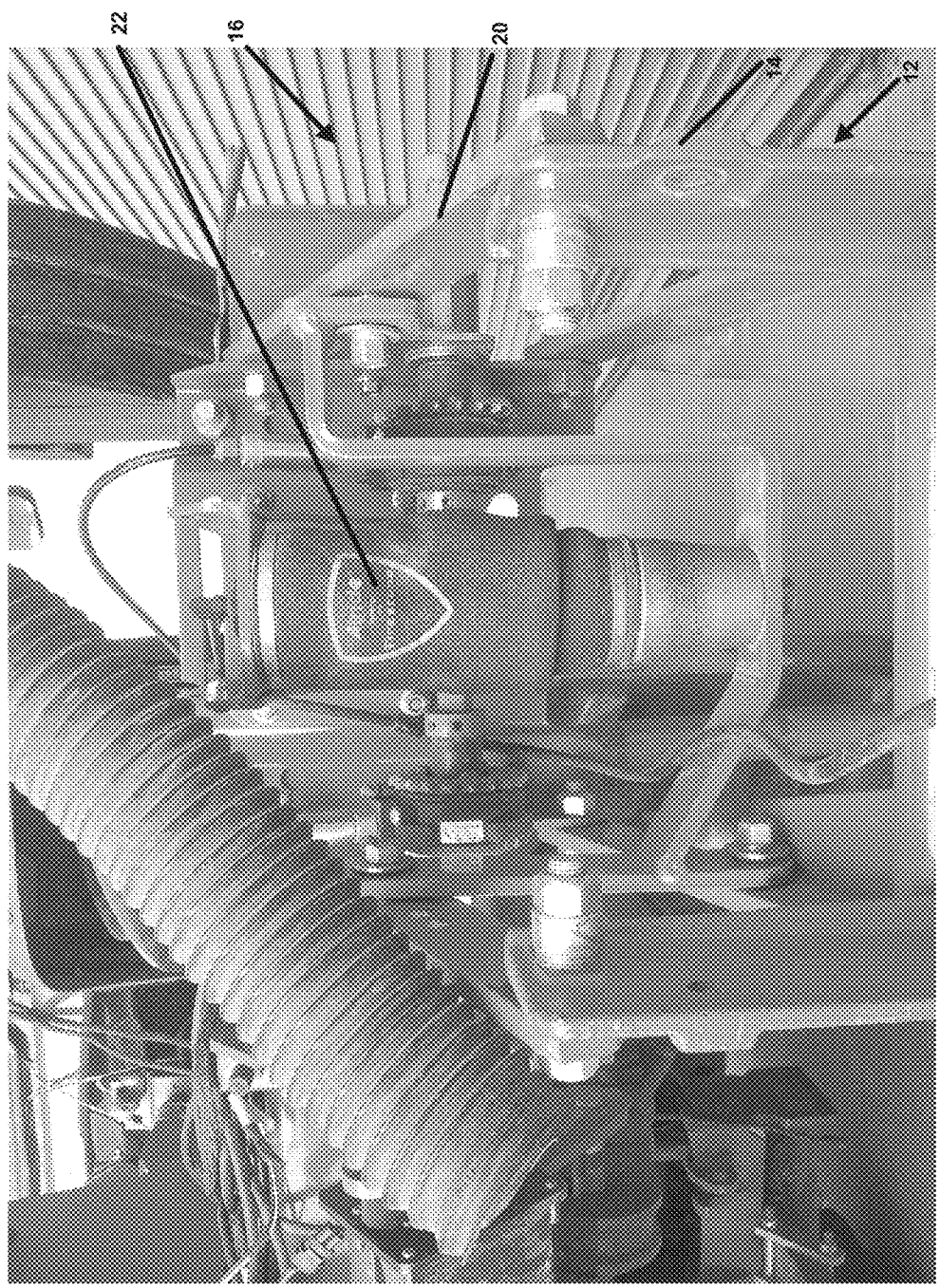
FIG. 2 is a schematic diagram that illustrates, in rear elevation view, an air bag coupled to an upper portion of a row unit.

FIGS. 1-4 show various views of an example planter (e.g., row crop planter) 10 with plural row units 12 and individual views of the row units for which certain embodiments of a planter depth control system may be used. For instance, a suitable row unit 12 may be embodied as a White Planters 8000 or 9000 Series row unit by AGCO, though others styles of row units and/or row units provided by other manufacturers may be suitable hosts for certain embodiments of a planter depth control system, and hence are contemplated to be within the scope of the disclosure. It should be appreciated by one having ordinary skill in the art that the row units 12 of the planter 10 are typically coupled to a transverse draw bar that is part of a frame or frames that further comprises a tongue that couples to a towing vehicle (e.g., tractor) via a hitch assembly. As these components are known, discussion of the same is omitted here for brevity. Referring to FIG. 1, shown is the planter 10 comprising a plurality of row units, including row unit 12. The row unit 12 comprises a frame 14 having an upper portion 16 and a lower portion 18 comprising an equalizer arm. Also shown coupled to the lower portion 18 are closing wheels, which are known, the description of which is omitted here to avoid obfuscating the features of a planter depth control system. The upper portion 16 comprises a parallel linkage 20, which is a common linkage among row units in general. The parallel linkage 20 permits up and down movement of the row unit 12 relative to a draw bar. Also shown (partly obscured) coupled to the upper portion 16 is an actuable device 22 (further shown in close-up in FIG. 2). The actuable device 22 is depicted in FIGS. 1-2 as an air bag, though it should be appreciated by one having ordinary skill in the art that other actuable devices may be used, including a hydraulic or pneumatic actuator, springs, shock absorber, etc. With continued reference to FIGS. 1-2, the actuable device 22 is adjustable (e.g., via an air valve or solenoid that is operably connected to a controller), enabling an increase or decrease in down force. The actuable device 22 acts between the draw bar and the parallel linkage 20 to apply a down force on the row unit 12. The down force applied by the actuable device 22 provides a sufficient amount of force to enable insertion of furrow openers 24 (e.g., double disc furrow or trench openers) into the soil to form a furrow or trench of desired depth.

Figure 3:
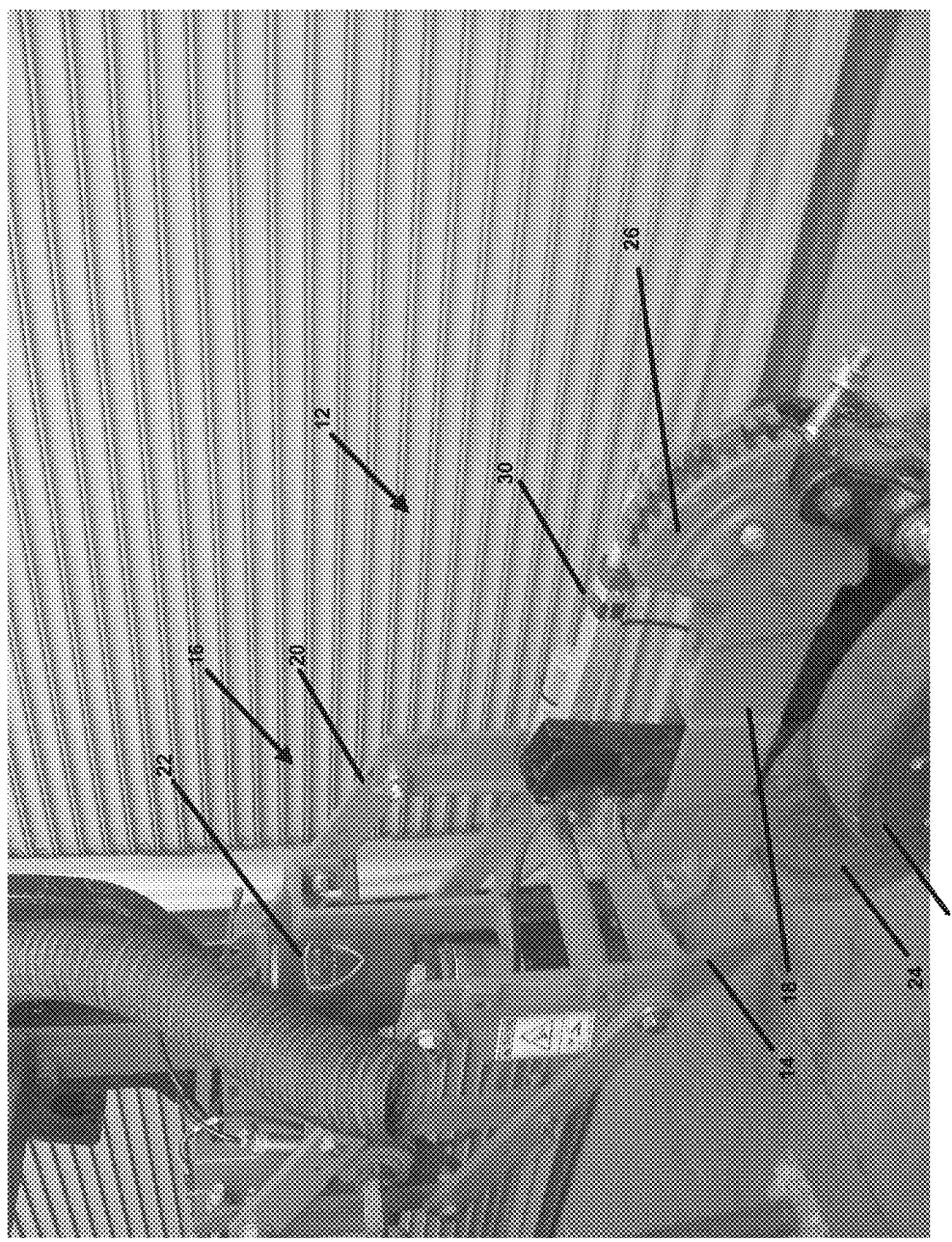
FIG. 3 is a schematic diagram that illustrates, in left rear perspective view, an example row unit for which certain embodiments of a planter depth control system may be used.

With continued reference to FIG. 1, and referring also to FIGS. 3-4, the lower portion 18 comprises a gauge wheel depth control linkage 26 that is pivotably coupled to the frame 14 (e.g., coupled to the lower portion 18), plural gauge wheels 28, and the furrow openers 24. The gauge wheels 28 are positioned slightly behind and immediately adjacent the respective furrow openers 24. The gauge wheel depth control linkage 26 permits the gauge wheels 28 to be adjustably positioned (e.g., vertically adjusted) relative to the furrow openers 24 to adjust the depth setting corresponding to the depth of the trench or furrow (as cut by the furrow openers 24). Also shown is an electric actuator 30. It is noted that FIG. 1 shows only one of the row units 12 equipped with an electric actuator 30, with the understanding that all of the row units 12 will normally be equipped with a respective electric actuator 30. The electric actuator 30 is of suitable size to be disposed within the space constraints provided between the upper and lower portions 16, 18. In one embodiment, the maximum amperage draw of the electric actuator 30 is less than eight (8) amperes. In some embodiments, the maximum amperage draw of the electric actuator 30 is less than two (2) amperes, and may operate as low as approximately one and one-half (1.5) amperes. As shown best in FIGS. 3-4, the electric actuator 30 is secured to a lower frame member of the upper portion 16, and pivotably coupled via attachment 32 to the gauge wheel depth control linkage 26. In effect, the electric actuator 30 enables positioning of the gauge wheels 28 via adjustment of the setting of the gauge wheel depth control linkage 26, somewhat similar to the manner the adjustment is done manually. In one embodiment, a controller signals the electric actuator 30, enabling adjustable positioning of the gauge wheels and hence depth adjustment (shallower or deeper) while at rest or while traversing the field.

Figure 5A:
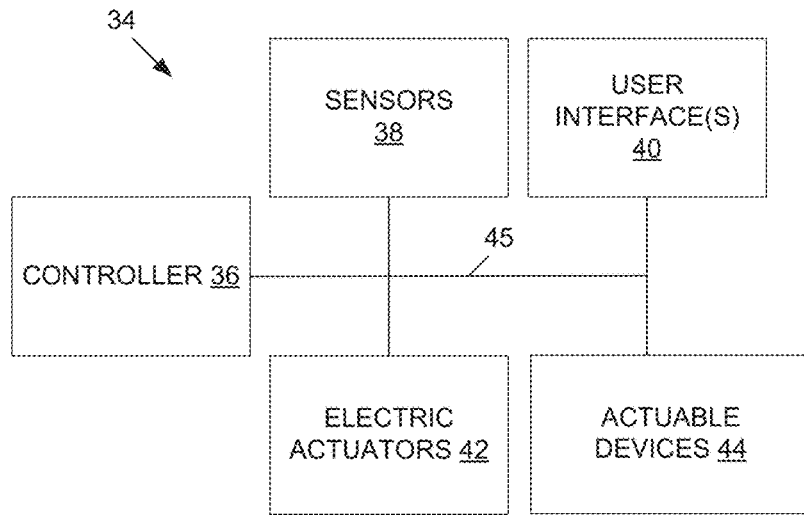
FIG. 5A is a block diagram that illustrates an embodiment of an example control system for a planter depth control system.

Attention is now directed to FIG. 5A, which illustrates an embodiment of an example control system 34 for a planter depth control system. One having ordinary skill in the art should appreciate in the context of the present disclosure that the example control system 34 is merely illustrative, and that some embodiments of control systems may comprise fewer or additional components, and/or some of the functionality associated with the various components depicted in FIG. 5A may be combined, or further distributed among additional components, in some embodiments. For instance, in one embodiment, the control system 34 is distributed among the planter 10 (including at one or more of the row units 12) and the towing vehicle. In some embodiments, the control system 34 is hosted entirely by the planter 10. In some embodiments, the control system 34 is distributed among the planter 10 and a remote computing device (e.g., in communication with components of the control system 34 via telemetry or radio frequency communications), and in some embodiments, the control system 34 is distributed among the towing vehicle, the planter 10, and a remote computing device. It should be appreciated by one having ordinary skill in the art that functionality disclosed herein of a planter depth control system is interchangeably used with the various embodiments of a control system 34 described herein. For purposes of brevity, attention is focused on an embodiment where the control system 34 is distributed among the planter 10 and a towing vehicle, with the understanding that other configurations may be used in some embodiments. The control system 34 comprises one or more controllers, such as controller 36, one or more sensors 38, user interfaces 40, plural electric actuators 42, and plural actuable devices 44, all coupled over a network 45, such as a controller area network (CAN), though not limited to a CAN network or a single network. In one embodiment, the network 45 may comprise a wired network (e.g., twisted pair, copper, etc.), a wireless network (e.g., based on IEEE 802.11, Bluetooth, Near Field Communications (NFC), etc.), or a combination of a wired and wireless network. The controller 36 is depicted as a single controller, but in some embodiments, plural controllers may be used in peer-to-peer or master/slave arrangements to effect operations of certain embodiments of a planter depth control system. The controller 36 is explained further below. The sensors 38 may include soil moisture and/or soil content sensors that operate based on wireless technology (e.g., reflected microwaves that indicate moisture content based on reflected microwave radiation, an optical spectrometer to determine constituent elements in the soil, etc.). The sensors 38 may include contact-type sensors suspended from the planter 10 or the towing vehicle that sample the soil and detect soil moisture directly. The sensors 38 may further include weather sensors, such as humidity, barometric, and/or wind sensors. The sensors 38 may also include a global navigation satellite systems (GNSS) receiver that enables the controller 36 to compare the current field location with a field and/or depth map that provides (e.g., based on ground sensors, soil analysis, etc.) contemporaneous measures of soil moisture and/or content and determine depth requirements based on matched GNSS receiver locations with locations in the field and/or depth map. For instance, the field and/or depth map may be associated with hardness of the soil, bulk density, soil series type, residue level, among other measures. The sensors 38 may include soil resistance sensors (e.g., load cells) that determine the resistance of the soil to the downforce, enabling a determination of downforce target margin, for instance. In some embodiments, the sensors 38 may comprise all or of any combination of these types of sensors, or a subset of them in some embodiments.

The user interfaces 40 may include an FNR handle, a keyboard/pad and/or mouse, a display device (e.g., tough-type display, liquid crystal diode (LCD), plasma-based, etc.), and/or other input and output devices (e.g., a microphone for audible input in some embodiments, speakers for audible output, haptic devices for feedback, etc.). In other words, the user interfaces 40 may enable control and/or feedback of depth adjustments performed by the control system 34 visually, audibly, and/or tactile. For instance, when comprising a display device, the user interfaces 40 may signal to or generally alert the operator in the towing vehicle (e.g., at an operator console) that there is a need for a change in depth and further provide controls (e.g., on the screen or associated with the screen, such as a keypad or keyboard) to effect the depth adjustment. In some embodiments, the display device may present feedback of an automatic depth adjustment, merely providing an alert to the operator that the depth adjustment has taken place. In some embodiments, the depth adjustment requirement may be presented to the operator, with the operator merely accepting the impending change or denying the change. These and/or other mechanisms of operator control of depth adjustment may be used, and hence are contemplated to be within the scope of the disclosure.

In one embodiment, the electric actuators 42 are each embodied as the electric actuator 30, with an electric actuator 42 dedicated to each row unit 12 (FIG. 1). The electric actuators 42 comprise a control portion (e.g., solenoid, motor, etc.) and a cylinder body comprising in the depicted example of FIG. 3, a linear actuator having a rod and piston type design, though it should be appreciated by one having ordinary skill in the art that rotary style designs and/or other types of electric actuators may be used in some embodiments.

The actuable devices 44 are each embodied as the actuable device 22, with an actuable device 22 dedicated to each row unit 12 (FIG. 1). As indicated previously, the actuable device 44 may comprise an air bag that is provided a source of air from a compressor and controlled using an air valve or other mechanism of control known in the art. In some embodiments, the actuable device 44 may be embodied as a hydraulic actuator, a pneumatic actuator, shocks, etc. Control for each of the actuable devices 44 may be integral to the actuable device 44, or via a separate control device coupled thereto.

Figure 5B:
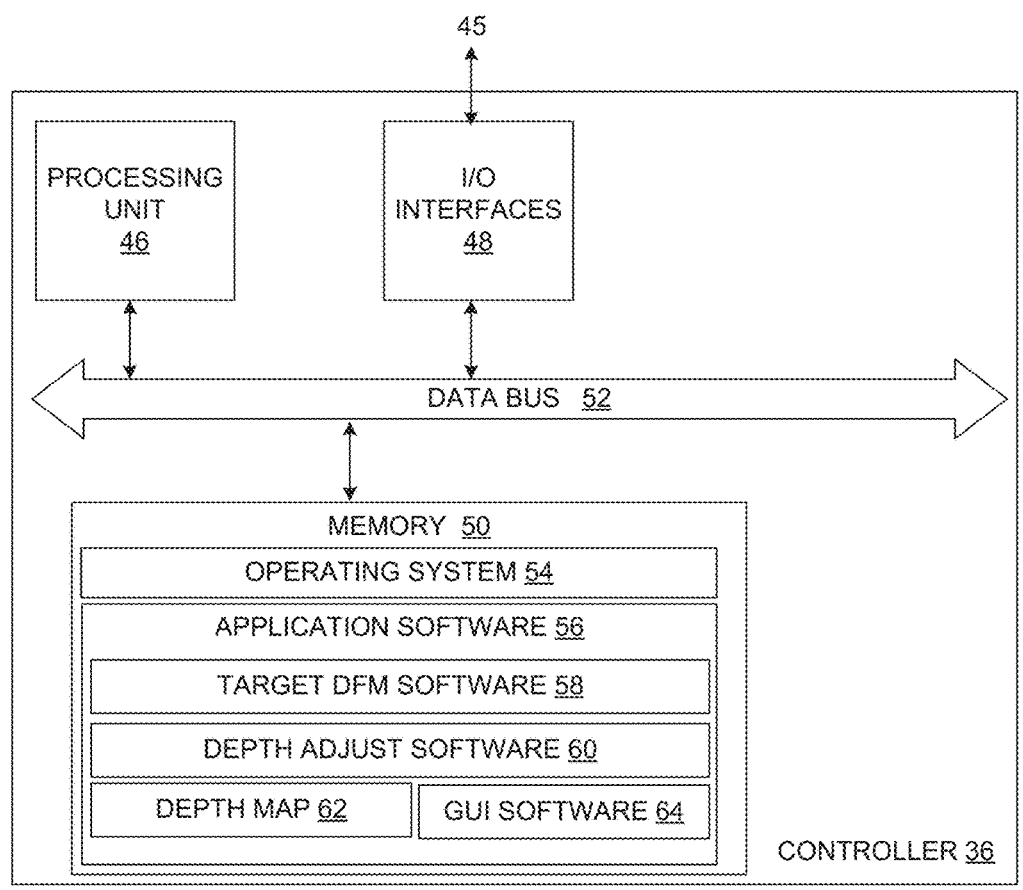
FIG. 5B is a block diagram that illustrates an embodiment of an example controller for the control system of FIG. 5A.

Referring to FIG. 5B, shown is an embodiment of the example controller 36, which comprises a computer architecture. It should be appreciated by one having ordinary skill in the art that the controller 36 depicted in FIG. 5B is one example illustration, and that in some embodiments, fewer, greater, and/or different components may be used. Also, it should be appreciated by one having ordinary skill in the art that certain well-known components of computer systems are omitted here to avoid obfuscating relevant features of the controller 36. In one embodiment, the controller 36 comprises one or more processing units 46, input/output (I/O) interface(s) 48, and memory 50, all coupled to one or more data busses, such as data bus 52. The memory 50 may include any one or a combination of volatile memory elements (e.g., random-access memory RAM, such as DRAM, SRAM, and SDRAM, etc.) and nonvolatile memory elements (e.g., ROM, Flash, solid state, EPROM, EEPROM, hard drive, CDROM, etc.). The memory 50 may store a native operating system, one or more native applications, emulation systems, or emulated applications for any of a variety of operating systems and/or emulated hardware platforms, emulated operating systems, etc. In the embodiment depicted in FIG. 5B, the memory 50 comprises an operating system 54 and application software 56. The application software 56 comprises target down force margin (DFM) software 58, depth adjust software 60, a depth map 62, and graphical user interface (GUI) software 64. It should be appreciated that in some embodiments, additional or fewer software modules (e.g., combined functionality) may be employed in the memory 50 or additional memory. In some embodiments, a separate storage device may be coupled to the data bus 52 or coupled via the I/O interfaces 48, such as a persistent memory (e.g., optical, magnetic, and/or semiconductor memory and associated drives).

With continued reference to FIGS. 1-5A, and referring also to FIG. 5B, the target down force margin (DFM) software 58 computes the down force margin (e.g., for each row unit 12) based on the weight of each row unit 12, the down force (as predetermined according to a default value, manually entered by the operator, and/or as determined by the target down force margin software 58 based on sensor input or historical values for the same field location, such as from a data structure or based on field or depth map data), and the soil resistance (e.g., as entered by the operator, such as via selection from a presented list matching the soil resistance to a soil type for the field to be traversed, via sensor input, and/or via field or depth map data or historical data). In one embodiment, the down force margin may range from approximately five hundred (500) to one thousand (1000) pounds, though these example ranges and/or values are illustrative of a typical implementation, and variations in ranges and/or end point values may differ. The target down force margin software 58 continually assesses whether a change in the down force margin is to be made, such as when a moisture change is detected (e.g., sensed, or as prescribed in a map or provided otherwise) or when there is a change in the constituent make-up of the soil that is detected (e.g., e.g., sensed, or as prescribed in a map or provided otherwise). Generally speaking, the target down force margin software 58 temporarily revises the target down force margin based on a need for a depth adjustment, and may actuate the actuable device 44 to achieve this new target. In other words, when the depth needs to be adjusted (e.g., for shallower depth), the target down force margin is adjusted to enable the electric actuator 42 to adjust the position of the gauge wheels 28 under lower amperage conditions than is capable using the current state of the art. For instance, when there is a need for shallower depth penetration by the furrow openers 24, the down force is reduced (e.g., by signaling to the actuable device 44) according to a reduced target margin. In some embodiments, the reduction may be by a factor of up to a ten (10) times reduction from the prior target (pre-adjustment). In one embodiment, the target down force margin is reduced to a range of approximately fifty (50) to one hundred (100) pounds, though other ranges may be targeted and hence contemplated to be within the scope of the disclosure. When the down force is reduced to the new target down force margin, the depth adjust software 60 responsively actuates the electric actuator 42 to adjust the positioning of the gauge wheels 28 based on adjusting (for shallower depth) the gauge wheel depth control linkage 26. The computation of the depth may be determined based on a depth map at some pre-planned time and/or geographic location (e.g., based on a recent field or depth map). In some embodiments, the depth may be computed by the depth adjust software 60 based on the direct or indirectly sensed soil moisture or change in soil content (indicating hardness or softness of soil) at a time corresponding to receiving the sensor input. For instance, the determination of shallower depth may be ascertained by the depth adjust software 60 based on input from (including access to) the depth map 62. When the input indicates a need for increased penetration of the furrow openers 24 (increased depth), the actuable device 44 remains at its current force, and the depth adjust software 60 signals to the electric actuator 42 to adjust the position of the gauge wheels 28 to effect an increase in depth (e.g., lower the gauge wheels 28). As indicated previously, the GUI software 64 may provide an option for the operator or the controller 36 to dictate the depth adjustments and/or provide feedback or monitoring of depth adjustments (e.g., to accept or merely observe and/or actively acknowledge). Although the description above for operations of an embodiment of a planter depth control system is described using a single row unit 12, it should be appreciated that there will typically be plural row units 12 with individualized control according to the application software 56, and thus reference to the singular control may be extended to like-individualized control for plural row units 12. In some embodiments, the application software 56 sequences the control among the respective row units 12 to ensure that the maximum current draw stays below a predetermined threshold (e.g., a threshold that, when met or exceeded, requires an additional generator or battery).

Execution of the application software 56, including the target down force margin software 58, the depth adjust software 60, the depth map 62, and the GUI software 64, are implemented by the processing unit 46 under the auspices of the operating system 54. In some embodiments, the operating system 54 may be omitted and a more rudimentary manner of control implemented. The processing unit 46 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 36.

The I/O interfaces 48 provide one or more interfaces to the network 45, as well as interfaces to one or more user interfaces or other devices. For instance, the I/O interfaces 48 receive wired or wireless signals from the sensors 38 and/or the user interface 40, and provides control signals to the electric actuators 42 and the actuable devices 44. The I/O interfaces 48 may also be coupled to one or more user interfaces to enable control of navigation and/or other machine functions. In some embodiments, the user interface 40 may be a headset-type display that is coupled to the I/O interfaces 48.

Note that the controller 36 and/or the control system 34 may comprise additional functionality, such as a cellular modem and browser software for accessing devices communicating with a wide area network (e.g., the Internet) and/or radio frequency modem for communications with devices located external to the planter 10 and/or the towing vehicle, as well as machine control software for enabling planting control of the planter 10.

When certain embodiments of the controller 36 are implemented at least in part in logic configured as software/firmware, as depicted in FIG. 5B, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 36 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
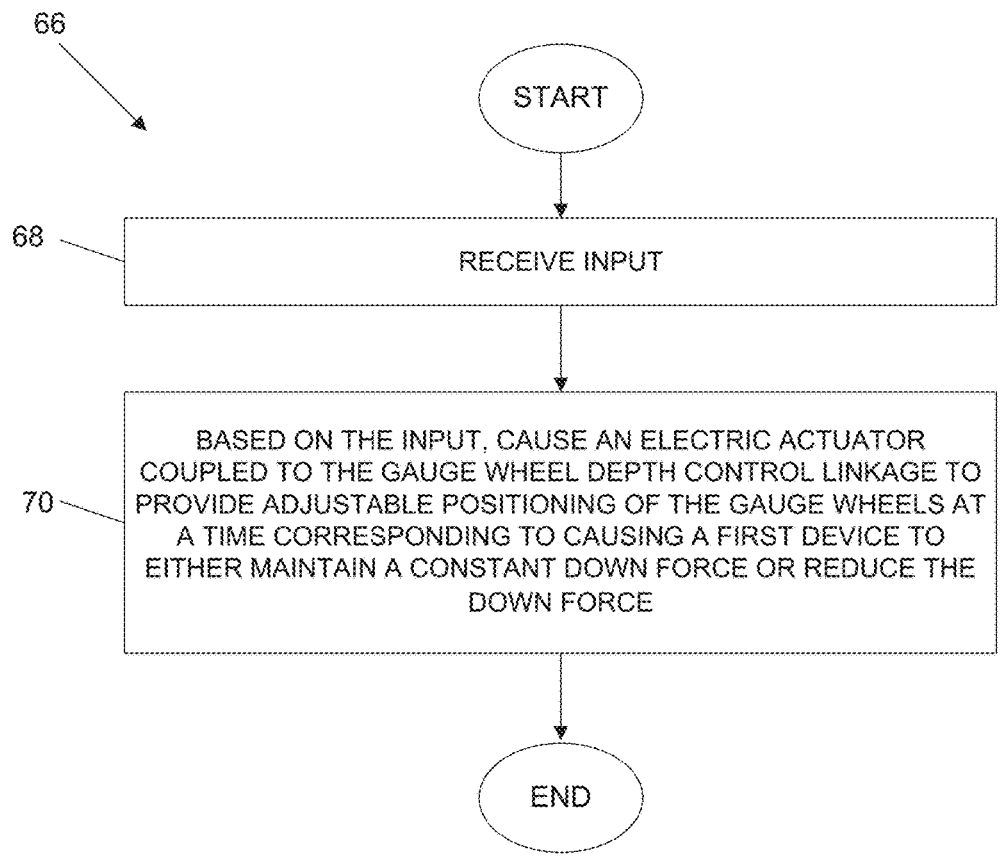
FIG. 6 is a flow diagram that illustrates an embodiment of an example planter depth control method.

In view of the above description, it should be appreciated that one embodiment of a method for operating a row unit having a frame comprising an upper portion and a lower portion, the upper portion comprising a parallel linkage, the lower portion comprising a gauge wheel depth control linkage, the gauge wheel depth control linkage coupled to plural gauge wheels, denoted in FIG. 6 as method 66, comprises receiving input (68); and based on the input, causing an electric actuator coupled to the gauge wheel depth control linkage to provide adjustable positioning of the gauge wheels at a time corresponding to causing a first device to either maintain a constant down force or reduce the down force (70). The input may be received at the controller 36, and may include operator input, field or depth map input, and/or sensor input, among other input. The causing may be as caused by signaling from the controller 36, or in some embodiments, based on peer-to-peer or master/slave communications between or among the electric actuator and the first device (e.g., actuable device) with or without the controller 36 (e.g., functionality of the controller 36 included at least in part in the electric actuator and/or the first device). The timing, or rather, the time correspond to as referred to in (70) may be such that the electric actuation occurs after (e.g., in response to) the reduction in down force has been achieved, or while the constant down force is maintained (the latter which may not require a dedicated change in signaling to achieve).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present invention are merely possible examples of implementations, merely set forth for a clear understanding of the principles of the disclosure. Many variations and modifications may be made to the above-described embodiment(s) of the disclosure without departing substantially from the spirit and principles of the disclosure. For instance, a need for a change in depth may be communicated from a sensor 38 to the actuable device 44 and the electric actuator (without the controller 36), which when the reduction in down force is completed (e.g., for a shallower depth adjustment), the completion triggers actuation of the electric actuator via electrical coupling between the devices. Similarly, the controller 36 may be circumvented for increased depth adjustment based on sensor input. All such modifications and variations are intended to be included herein within the scope of this disclosure and protected by the following claims.

At least the following is claimed:

1. A row unit, comprising:
    a frame comprising an upper portion and a lower portion, the upper portion comprising a parallel linkage, the lower portion comprising a gauge wheel depth control linkage, the gauge wheel depth control linkage coupled to plural gauge wheels;
    a first device coupled to the upper portion and configured to provide an adjustable down force; and
    an electric actuator coupled to the gauge wheel depth control linkage, the electric actuator configured to provide adjustable positioning of the gauge wheels, wherein the electric actuator is configured to adjust the position of the gauge wheels from a first position to a second position responsive to the first device reducing the down force.

2. The row unit of claim 1, wherein the change from the first position to the second position corresponds to a shallower depth setting adjustment.

3. The row unit of claim 1, wherein the first device is configured to reduce the down force according to a down force target margin.

4. The row unit of claim 3, wherein the down force target margin is approximately ten percent of a predetermined margin that existed prior to the reduction.

5. The row unit of claim 3, wherein the down force target margin ranges from approximately fifty pounds to one hundred fifty pounds.

6. The row unit of claim 1, wherein the first device is configured to maintain a constant down force at a time corresponding to when the electric actuator adjusts the position of the gauge wheels from a first position to a second position.

7. The row unit of claim 6, wherein the change from the first position to the second position corresponds to a deeper depth setting adjustment.

8. The row unit of claim 1, wherein the first device comprises an air bag.

9. The row unit of claim 1, wherein the electric actuator comprises a maximum current draw of less than eight amps.

10. The row unit of claim 1, wherein the electric actuator comprises a maximum current draw of less than two amps.

11. A planter depth control system, comprising:
    a plurality of row units, wherein each row unit comprises:
        a frame comprising an upper portion and a lower portion, the upper portion comprising a parallel linkage, the lower portion comprising a gauge wheel depth control linkage, the gauge wheel depth control linkage coupled to plural gauge wheels;
        a first device coupled to the upper portion and configured to provide an adjustable down force; and
        an electric actuator coupled to the gauge wheel depth control linkage, the electric actuator configured to provide adjustable positioning of the gauge wheels; and
    a controller configured to:
        control actuation of the first device and the electric actuator based on an input;
        adjust a down force target margin to a new range; and
        cause the electric actuator to adjust a position of the gauge wheels to a shallower depth setting adjustment responsive to the first device reducing the down force to a value within the new range.

12. The planter depth control system of claim 11, wherein the new range is approximately ten percent of the down force target margin prior to the adjustment to the new range, and the electric actuator comprises a maximum current draw of less than approximately two amps.

13. The planter depth control system of claim 11, wherein the new range is from approximately fifty pounds to one hundred fifty pounds, and the electric actuator comprises a maximum current draw of less than approximately two amps.

14. The planter depth control system of claim 11, wherein responsive to the adjustment in position, the controller is further configured to cause the first device to return the down force to a value that existed before the reduction.

15. The planter depth control system of claim 11, wherein based on the input, the controller is configured to:
   cause the first device to maintain the current down force at a time corresponding to causing the electric actuator to adjust the position of the gauge wheels to a deeper depth setting adjustment.

16. The planter depth control system of claim 11, wherein the input is based on manual input, a prescribed depth map, or a sensor.

17. The planter depth control system of claim 11, wherein the controller is configured to control actuation of the first device and the electric actuator for each of the row units sequentially.

18. A method for operating a row unit having a frame comprising an upper portion and a lower portion, the upper portion comprising a parallel linkage, the lower portion comprising a gauge wheel depth control linkage, the gauge wheel depth control linkage coupled to plural gauge wheels, the method comprising:
   receiving input; and
   based on the input, causing an electric actuator coupled to the gauge wheel depth control linkage to provide adjustable positioning of the gauge wheels at a time corresponding to causing a first device to either maintain a constant down force or reduce the down force.

* * * * *